United States Patent [19]

Sethi

[11] Patent Number: 4,824,609
[45] Date of Patent: Apr. 25, 1989

[54] PROCESS FOR PURIFYING A WORKING COMPOUND

[75] Inventor: Dalbir S. Sethi, Cranbury, N.J.

[73] Assignee: FMC Corporation, Philadelphia, Pa.

[21] Appl. No.: 141,387

[22] Filed: Jan. 7, 1988

[51] Int. Cl.$^4$ ............................................. C07C 50/18
[52] U.S. Cl. ...................................... 260/369; 423/588
[58] Field of Search ......................... 260/369; 423/588

[56] References Cited

U.S. PATENT DOCUMENTS

| | | | |
|---|---|---|---|
| 2,739,875 | 3/1956 | Sprauer et al. | 23/207 |
| 2,940,987 | 6/1960 | Eller et al. | 260/369 |
| 3,073,680 | 1/1963 | Jenney et al. | 260/369 |
| 3,210,382 | 10/1965 | Speltinckx et al. | 260/369 |
| 3,247,228 | 4/1966 | Kunowski | 260/369 |
| 3,330,625 | 7/1967 | Baker et al. | 260/369 |
| 3,387,938 | 6/1968 | Leaver | 260/369 |
| 3,432,267 | 3/1969 | Lee et al. | 260/369 |
| 3,767,779 | 10/1973 | Coingt | 423/588 |
| 3,907,836 | 9/1975 | Stepputat et al. | 260/369 |
| 3,912,766 | 10/1975 | Logan et al. | 260/369 |
| 3,965,251 | 6/1976 | Shin et al. | 260/369 |
| 4,308,200 | 12/1981 | Fremont | 260/110 |
| 4,547,292 | 10/1985 | Zarchy | 210/634 |
| 4,566,998 | 1/1986 | Ochoa et al. | 260/369 |
| 4,568,447 | 2/1986 | Pujado et al. | 208/177 |
| 4,584,140 | 4/1986 | Blewett et al. | 260/412.8 |
| 4,668,436 | 5/1987 | Sethi | 260/369 |

FOREIGN PATENT DOCUMENTS

| | | | |
|---|---|---|---|
| 608824 | 11/1960 | Canada | 423/588 |
| 132551 | 11/1978 | Japan | 260/369 |
| 62237 | 4/1982 | Japan | 260/369 |

OTHER PUBLICATIONS

Kirk-Othmer *Encyclopedia of Chemical Technology*, Third Ed., Supplement vol., John Wiley & Sons, N.Y. (1984), pp. 872-893.

Primary Examiner—John Doll
Assistant Examiner—Wayne A. Langel
Attorney, Agent, or Firm—R. E. Elden; R. L. Andersen; E. G. Seems

[57] ABSTRACT

A process is provided to remove inert contaminants from a working compound employed for the manufacture of hydrogen peroxide by the reduction and oxidation of a solution of alkylated anthraquinones and derivatives. The contaminants are removed by the process of contacting the working compound, a solvent, and carbon dioxide to form a first portion and a residue portion, separating the two portions and recovering the purified working solution from the first portion.

18 Claims, 2 Drawing Sheets

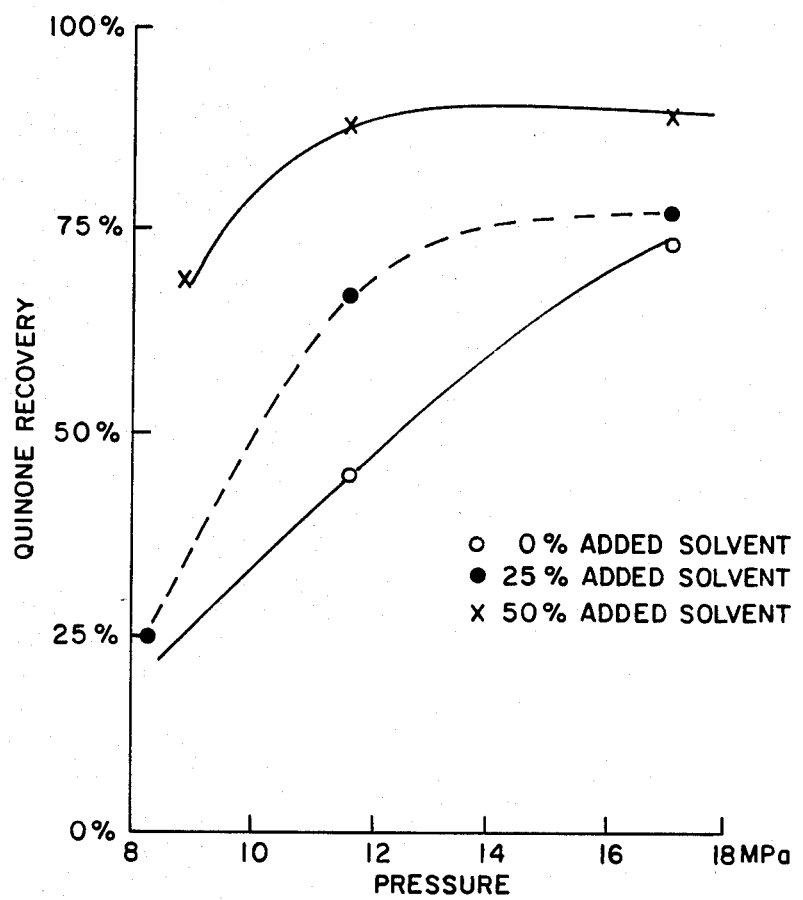

PROCESS FOR PURIFYING A WORKING COMPOUND

The present invention is a process for regenerating and purifying a working compound used to produce hydrogen peroxide by the reduction and oxidation of an alkylated anthraquinone. More particularly, the invention is a process for removing inert contaminants from a working compound by forming a two-phase system, separating the phase containing the purified working compound from the phase containing the inert contaminants and recovering the purified working solution.

The antrraquinone process for manufacturing hydrogen peroxide is well known. The process employs a substituted anthraquinone or a derivative thereof called the working compound which is cyclically reduced and oxidized to produce hydrogen peroxide and the starting oxidized or quinone form of the working compound. The working compound is usually dissolved in a solvent or a mixture of solvents to form a working solution. The first solvent for the working compound in the quinon form and the second solvent for the working compound in the hydroquinone or reduced form. During each cycle part of the working compound is converted into a by-product. A hydrogenated derivative, a tetrahydroanthraquinone, is effective in producing hydrogen peroxide in the process and is considered to constitute part of the working compound and of the available quinone. An epoxytetrahydroanthraquinone although ineffective in producing hydrogen peroxide can be converted into a working compound and is considered to be part of the "total quinone", the available quinone or available working compound. Other working compound derivatives, such as, octahydroanthraquinone with its very slow rate of producing hydrogen peroxide, and anthrone derivatives and polymers which are incapable of producing hydrogen peroxide are collectively classified as "inerts". Hydrogenated and oxidized derivatives of the solvents also are included as inerts.

U.S. Pat. No. 3,767,779 to Coingt teaches a process in which the concentration of inerts is maintained at 15% or more to thereby increase the solubility of working compound in the working solution. As the inerts are primarily derivatives of the working compound, it is reasonable to expect that the basic chemistry truism, "like dissolves like" applies and that inerts and the working compound would be mutually soluble in each other. However, a high concentration of inerts in the working solution increases the specific gravity of the working solution causing difficulty in the extraction of the hydrogen proxide. Further, a high concentration of inerts also increases the viscosity of the solution, decreasing the efficacy of the hydrogenation step, the oxidation step and the extraction step.

Other than the teaching of U.S. Pat. No. 3,767,779, the teaching of the prior art as a whole is that inerts are undesirable in the working solution. As early as 1956, U.S. Pat. No. 2,739,875 to Sprauer et al. disclosed the problem of the conversion of the working compound into ineffective derivatives and teaches a process to convert some of the derivatives such as the epoxy compounds into working compounds. Kirk-Othmer, Encyclopedia of Chemical Technology, Third Ed., Vol. 13, John Wiley & Sons, N.Y. (1981) discloses at page 20 that degradation products (inerts and epoxy derivatives) formed during the cyclic reduction and oxidation of the working compound must be removed or regenerated. Processes disclosed there to be useful for removing or regenerating the working compound include processes for regenerating an epoxide and processes for removing inerts. For example, dehydrogenating in the presence of an olefin and/or treating with an alkali, an acid, a metal oxide, a metal chloride, a metal silicate or aluminosilicate, a dithionate, oxygen or ozone. Other processes disclosed therein include washing with water, recrystallizing, extracting with alcohols, distilling, ion-exchanging and heating in an inert atmosphere.

U.S. Pat. No. 4,668,436 to Sethi teaches a process to regenerate and purify a working solution. The regeneration and purification is effected by removing inerts by contacting the working solution with a noncyclic hydrocarbon such as pentane to form a liquid first phase and a second phase, separating the two phases and distilling the liquid first phase to recover the noncyclic hydrocarbon overhead and the purified working solution as bottoms. The process is effective in removing the inerts from a working solution. The process is most effective when the working solution is partially hydrogenated. However, it does require handling flammable hydrocarbons.

The present invention is a process which overcomes the deficiencies of the prior art processes. It is a process for separating contaminants from an impure, contaminated working compound used to manufacture hydrogen peroxide by the cyclic reduction and oxidation of an alkylated anthraquinone. The process comprising forming a mixture by contacting the impure working compound, a nonaqueous solvent for the working compound, and a carbon dioxide fluid at a pressure of about 7 MPa to about 24 MPa and at a temperature of from about $-5°$ C. to about $100°$ C., separating the mixture into a first portion containing working compound, solvent and carbon dioxide fluid and a residue portion containing contaminants, and separating carbon dioxide from the first portion.

The carbon dioxide may be present either at a pressure of 7 to 24 MPa between $-5°$ C. to $100°$ C. The working compound and the carbon dioxide may be contacted in the presence of any solvent suitable for dissolving an anthraquinone. Suitable solvents include alcohols, ketones, carboxylate esters, phosphate esters, petroleum distillates, and the like. A solvent employed for the production of hydrogen peroxide is desirable. An alkylated benzene is a particularly desirable solvent.

The working compound, solvent and carbon dioxide fluid may be contacted batchwise in a single stage, or multiple stages. Alternatively, the working compound, solvent and carbon dioxide fluid may be contacted continuously either cocurrently or countercurrently. When the working compound and carbon dioxide fluid are contacted in a batchwise or continuous countercurrent manner the contacting is easily accomplished by mixing an anthraquinone solvent with the carbon dioxide fluid. A solution of the working compound dissolved in solvents employed in a hydrogen peroxide process as working solution is particularly desirable.

The percentage recovery of working compound increases with temperature from about $-5°$ C. to a maximum of about $25°$ C. The process is effective over the range of about $-5°$ C. to about $150°$ C., but it is desirable to operate between $0°$ C. and about $100°$ C., and for optimum recovery about $5°$ C. to about $50°$ C. Preferably the temperature should range between $10°$ C. and $30°$ C.

The relative purity of working compound recovered from contaminated working compound is a function of the pressure of the carbon dioxide fluid. The percentage recovery of working compound in the first portion and of the contaminants in the first portion are also a function of pressure of the carbon dioxide fluid. After a single contact at a pressure of less than about 6.6 MPa less than half of the working compound originally present in the contaminated working compound is recovered in the first portion together with less than 10% of the contaminants originally present. At 28 MPa about 80% of the working compound is present in the first portion and almost 95% of the contaminants. The effective operating pressure is between about 7 MPa and 24 MPa. Desirably the pressure should be between about 10 MPa and 20 MPa.

Unexpectedly, the present process was found useful in recovering working compound not only when the working compound is contaminated with inerts, but also when contaminated with poisons for palladium based hydrogenation catalysts.

The mixture of carbon dioxide and impure working compound may be separated into a first portion and a residue portion by any conventional method known in the art such as centrifuging, decanting and the like. Desirably, the mixture can be separated by releasing the pressure very slightly to urge first portion to flow from the vessel containing the mixture leaving the residue portion.

After the first portion is separated from the residue portion the carbon dioxide may be separated from the first portion by releasing the pressure sufficiently to separate the carbon dioxide as a gas. The carbon dioxide gas may be compressed and recirculated or vented to the atmosphere.

The following figures illustrate two embodiments of the invention suitable for practicing the invention.

FIG. 3 illustrates the effect of pressure and solvent on quinone recovery.

Figure 1:
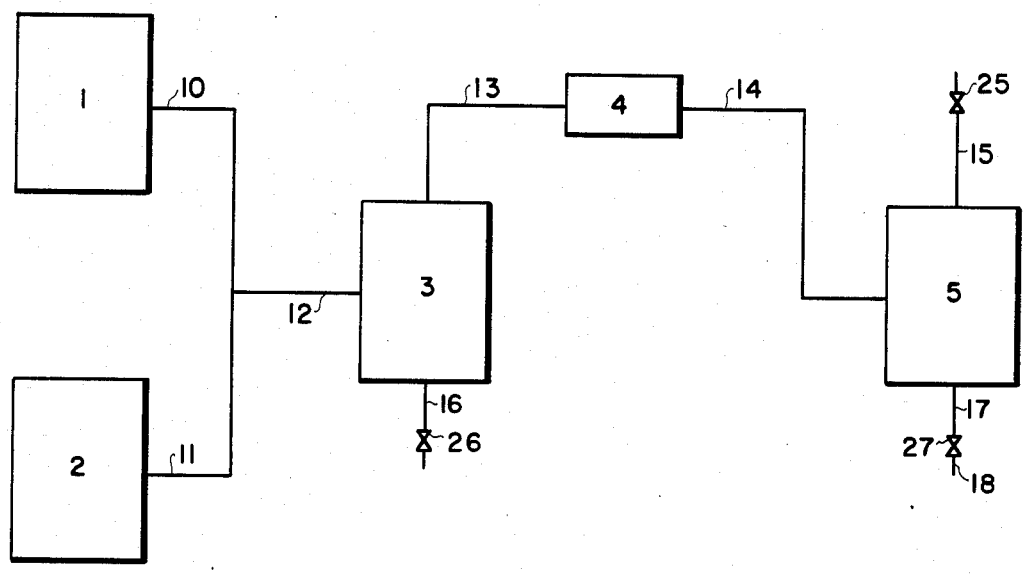
FIG. 1 represents a laboratory batch or cocurrent apparatus employed in the examples.

FIG. 1. Reservoir 1 containing carbon dioxide fluid is connected by conduit 10 to conduit 12. Reservoir 2 containing a solution of impure working compound in a solvent is connected by conduit 11 to conduit 12. Carbon dioxide fluid and working compound solutions are contacted together in conduit 12 to form a mixture which is directed into vessel 3. The mixture separates therein into a lower density first portion containing working solution and solvent, and a higher density residue portin containing contaminants. The first portion is urged from vessel 3 through conduit 13, back-pressure valve 4 and conduit 14 into reservoir 5 by a reduced pressure maintained in reservoir 5. There the carbon dioxide fluid separates from the vessel through conduit 15 and valve 25 leaving a solution of purified working compound in solvent. The solution can be recovered concomitantly through conduit 17, valve 27 and conduit 18. Optionally, carbon dioxide fluid can be recovered from valve 25, compressed and recycled to reservoir 1.

The residue portion in vessel 3 may be withdrawn through conduit 12 and valve 26, or, optionally reprocessed by repeating the above steps except employing a solvent in reservoir 2.

Preferably, contacting means may be employed in conduit 12 such as a static mixer, and in vessel 3 such as packing or distributor trays.

Figure 2:
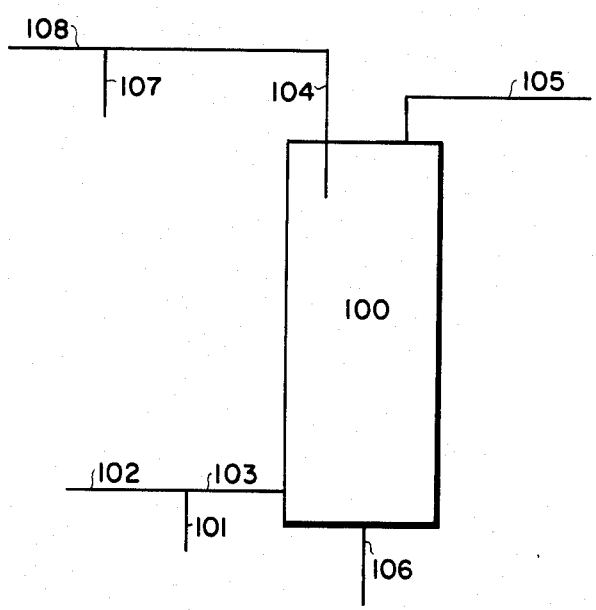
FIG. 2 represents, as a preferred embodiment, a countercurrent apparatus, suitable for continuous purification of a working solution sidestream of an operating plant.

FIG. 2 is a preferred embodiment which can be operated continuously. The figure shows conduit 101 directing carbon dioxide fluid from a source (not shown) into conduit 103 where it mixes with a solvent from conduit 102 from a source (not shown). The solvent-carbon dioxide fluid in conduit 103 is directed into countercurrent contactor 100 near the bottom. Contactor 100 may optionally have trays or other internal contact means. Conduits 108 and 104 direct a solution of a working compound into contractor 100 near the top. Optionally, carbon dioxide fluid may be incorporated into the solution of working solution through conduit 107. Within contactor 100 combined solvent carbon dioxide fluid flow upwards contacting the downward flowing solution of working compound. An extracted residue portion emerges from contactor 100 through line 106 near the bottom while a first portion comprising carbon dioxide fluid containing solvent and extracted working compound emerges from the top of contactor 100 through line 106. The carbon dioxide fluid and working compound solvent mixture in the first portion are separated by known means (not shown). It will be clear to one skilled in the art that this embodiment may also be operated in a cocurrent mode with minimal changes.

The best methods for practicing the present invention are disclosed by the following nonlimiting examples. Unless otherwise specified the following examples were batch rather than continuous employing the apparatus of FIG. 1.

EXAMPLE 1

Typical degraded work solutions were screened (at ambient temperature) by processing batchwise. The operating conditions and results are presented as Table I. Total quinones include the alkylated anthraquinone (either 2-ethyl or 2-amyl), the tetrahydroquinone derivative and epoxy derivative. The solvent system included a mixed C9/C10 alkylated aromatic solvent and a polar solvent, either trioctal phosphate (TOF), cyclohexylacetate (sextate) or diisobutylcarbinol (DIBC). The total residue reported includes inerts from the solvent and unrecovered working compound.

In preliminary spot tests it was found that both 2-ethylanthraquinone and its tetrahydro derivative (EAQ) and 2-amylanthraquinone and its tetrahydro derivative (AAQ) were substantially insoluble in carbon dioxide fluid absent solvent. That is the quinone solubility was only a few parts per million. This example shows the present invention is in general useful for any alkylated anthraquinones dissolved in any inert solvent system.

EXAMPLE 2

The effect of temperature was determined by a series of replicated tests at 17.2 MPa employing an EAQ-TOF working solution.(EAQ dissolved in a C9/C10 aromatic and TOF containing inerts). The results and conditions are presented in Table II. The temperature was measured in vessel 3.

This example shows the range over which the process is generally operable is the freezing point of the solutions (about $-5°$ C.) to about 150° C. with a desirable range between about 10° C. and 100° C.

EXAMPLE 3

The effect of pressure and solvent on the process was determined on a contaminated working solution (EAQ and TOF). The results are presented as Table III and graphically as FIG. 3.

The concentration of inerts in the initial and recovered solution was determined as area percent, the proportion of the area of the high pressure liquid chromatographs attributable to the inerts.

EXAMPLE 4

The effect of inerts in the solution on quinone recovery was dtermined in a series of examples at ambient temperature and 17.2 MPa. The conditions and results are presented as Table IV.

EXAMPLE 5

Physical properties of typical work solution employed in hydrogen peroxide plants were evaluated before and after treatment by the present process. The density and viscosity of treated solution approximate new work solution. Results are presented as Table V.

TABLE I

SCREENING TESTS ON WORKING SOLUTIONS

| Solution Type* | | Pressure | Percent by Weight | |
|---|---|---|---|---|
| Quinone | Solvent | MPa | Inerts Removed | Quinone in Recovered Solu. |
| EAQ | TOF | 19.3 | 85.7 | 85 |
| EAQ | TOF | 17.2 | 86.8 | 88 |
| EAQ | TOF | 8.3 | 91.9 | 89 |
| EAQ | TOF | 17.2 | 92.8 | 89 |
| AAQ | DIBC | 19.3 | 84.3 | 82 |
| EAQ | SEXTATE | 19.3 | 93.3 | 89 |

*EAQ = 2-ethylanthraquinones
AAQ = 2-amylanthraquinones
TOF = trioctylphosphate
DIBC = diisobutyl carbinol
SEXTATE = cyclohexylacetate

TABLE II

EFFECT OF TEMPERATURE

| Temp. °C. | Wt. % of Quinones Recovered |
|---|---|
| −4 | 59–62 |
| 10 | 62–66 |
| 24–27 | 55–60 |
| 38 | 45.4 |
| 66 | <1 |

TABLE III

EFFECT OF PRESSURE AND SOLVENT ON QUINONE (WC) RECOVERY

| Added C9 Solvent | Press. MPa | Initial Solution | | | Recovered Solution | | | % WC Recovered |
|---|---|---|---|---|---|---|---|---|
| | | g Total | % WC | Area % | g | % WC | Area % | |
| 0 | 11.7 | 139 | 11.5 | 22.8 | 100 | 6.8 | 0.86 | 43 |
| 0 | 17.2 | 254 | 11.5 | 22.8 | 205 | 9.6 | 3.12 | 70 |
| 25 | 8.3 | 96 | 8.2 | 19.0 | 53 | 3.4 | 0.79 | 23 |
| 25 | 11.7 | 103 | 8.6 | 19.5 | 84 | 7.0 | 1.30 | 67 |
| 25 | 17.2 | 93 | 8.2 | 19.3 | 77 | 7.5 | 3.70 | 75 |
| 50 | 8.3 | 105 | 5.9 | 17.5 | 90 | 4.8 | 1.90 | 68 |
| 50 | 11.7 | 96 | 5.9 | 17.5 | 86 | 5.9 | 2.60 | 88 |
| 50 | 17.2 | 97 | 5.9 | 17.5 | 89 | 5.6 | 4.00 | 88 |

Inerts = area %

TABLE IV

EFFECT OF INERTS ON QUINONE RECOVERY

| Initial Solution | | % Solvent Added | Recovered Solution | | % WC Recovered |
|---|---|---|---|---|---|
| g sol. | % WC | | g Sol. | % WC | |
| 207 | 9.5 | 0 | 192 | 9.6 | 94.7 |
| 190 | 9.8 | 5 | 173 | 9.3 | 87.0 |
| 190 | 10.0 | 10 | 155 | 8.8 | 72.3 |

TABLE V

PHYSICAL PROPERTIES OF WORK SOLUTION BEFORE AND AFTER PURIFICATION

| Solution Type | | Physical Properties | | | |
|---|---|---|---|---|---|
| | | Viscosity CPS | | Density g/ml | |
| Quinones | Solvent | Untreated | Treated | Untreated | Treated |
| EAQ | TOF | 5.995 | 2.270 | 0.9252 | 0.9200 |
| AAQ | DIBC | 9.227 | 4.409 | 0.9430 | 0.9239 |
| EAQ | SEXTATE | 3.487 | 2.453 | 0.9652 | 0.9561 |

I claim:

1. A process for separating contaminants from an impure, contaminated working compound used to manufacture hydrogen peroxide by the cyclic reduction and oxidation of an alkylated anthraquinone, the process comprising forming a mixture by contacting the impure working compound, a nonaqueous solvent for the working compound, and a carbon dioxide fluid at a pressure of about 7 MPa to about 24 MPa and at a temperature of from about −5° C. to about 100° C., separating the mixture into a first portion containing working compound, solvent and carbon dioxide fluid and a residue portion containing contaminants, and separating carbon dioxide from the first portion.

2. The process of claim 1 wherein the temperature of the mixture is maintained between about 5° C. and about 50° C.

3. The process of claim 1 wherein the pressure of the mixture is maintained at about 8 MPa to about 20 MPa.

4. The process of claim 2 wherein the pressure of the mixture is maintained at about 8 MPa to about 20 MPa.

5. The process of claim 1 wherein the contaminated working compound is present as a working solution.

6. The process of claim 2 wherein the contaminated working compound is present as a working solution.

7. The process of claim 3 wherein the contaminated working compound is present as a working solution.

8. The process of claim 4 wherein the contaminated working compound is present as a working solution.

9. The process of claim 1 wherein the nonaqueous solvent is selected from the group consisting of alcohol, ketones, carboxylate esters, phosphate esters and petroleum distillates.

10. The process of claim 1 wherein the nonaqueous solvent is an alkylated benzene.

11. The process of claim 2 wherein the nonaqueous solvent is an alkylated benzene.

12. The process of claim 3 wherein the nonaqueous solvent is an alkylated benzene.

13. The process of claim 4 wherein the nonaqueous solvent is an alkylated benzene.

14. The process of claim 5 wherein the nonaqueous solvent is an alkylated benzene.

15. The process of claim 6 wherein the nonaqueous solvent is an alkylated benzene.

16. The process of claim 7 wherein the nonaqueous solvent is an alkylated benzene.

17. The process of claim 8 wherein the nonaqueous solvent is an alkylated benzene.

18. The process of claim 9 wherein the nonaqueous solvent is an alkylated benzene.

* * * * *